(12) United States Patent
Norberg

(10) Patent No.: US 6,234,910 B1
(45) Date of Patent: May 22, 2001

(54) SHAFT COUPLING ARRANGEMENT

(75) Inventor: Stefan Norberg, Avon, CT (US)

(73) Assignee: Ovako Couplings AB, Hofors (SE)

( * ) Notice: Subject to any disclaimer, the term of this patent is extended or adjusted under 35 U.S.C. 154(b) by 0 days.

(21) Appl. No.: 09/421,544

(22) Filed: Oct. 20, 1999

(51) Int. Cl.[7] ............................................ F16C 3/00
(52) U.S. Cl. .......................... 464/182; 464/7; 464/53; 464/179; 403/294
(58) Field of Search ........................... 464/7, 53, 87, 464/179, 181, 182, 183, 185, 153, 154; 403/293, 294

(56) References Cited

U.S. PATENT DOCUMENTS

| | | | |
|---|---|---|---|
| 1,227,432 | * 5/1917 | Grimes | 464/153 |
| 4,312,193 | * 1/1982 | Gibbs et al. | 464/154 |
| 4,526,556 | * 7/1985 | Sundberg et al. | 464/182 |
| 5,139,460 | * 8/1992 | Hoyt, III et al. | 464/154 |
| 5,425,675 | * 6/1995 | Pfeifer | 464/183 |
| 6,039,320 | * 3/2000 | MacDonald | 464/180 |

* cited by examiner

*Primary Examiner*—Lynne H. Browne
*Assistant Examiner*—Aaron Dunwoody
(74) *Attorney, Agent, or Firm*—Burns, Doane, Swecker & Mathis, L.L.P.

(57) ABSTRACT

A shaft arrangement includes two shaft ends positioned in end-to-end abutting relation and an outer sleeve surrounding the abutting ends of the two shaft ends. The outer sleeve has through-channels for introducing pressure medium in the interface between the shaft ends and the outer sleeve to create a sleeve expanding effect during mounting and dismounting, and a radial grip acting between the sleeve and the two shaft ends, when the pressure medium has been drained through the through-channels, with the radial grip effecting a radial as well as an axial joining of the shaft ends and the outer sleeve. Each shaft end adjacent its abutting end face is equipped with a grip arrangement that is engaged by a thrust member. The thrust member bridges the abutting end faces and engages the grip arrangement inside the outer sleeve to inhibit the two shaft ends from being axially pulled apart even upon application of a large axial force.

18 Claims, 1 Drawing Sheet

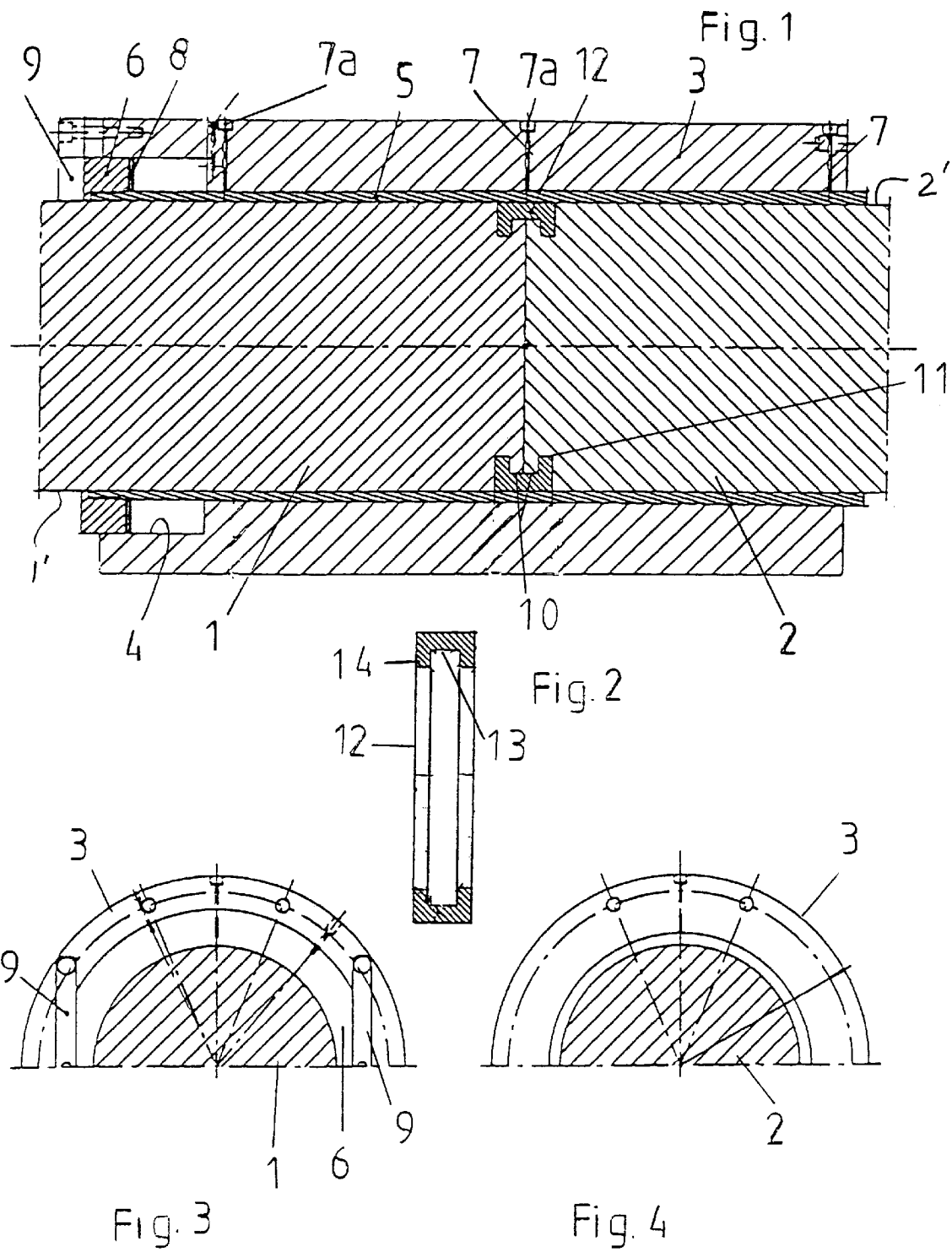

US 6,234,910 B1

SHAFT COUPLING ARRANGEMENT

FIELD OF INVENTION

The present invention generally relates to a shaft connecting device. More particularly, the present invention pertains to a shaft coupling for interconnecting two shaft ends in end-to-end abutting relation.

BACKGROUND OF THE INVENTION

Shaft couplings are used to connect together two shaft ends in an end-to-end abutting relation. A known form of shaft coupling includes an outer sleeve that surrounds the abutting ends of the two shaft ends. The outer sleeve is provided with a through-channel for introducing pressure medium in the interfaces between the shaft ends and the outer sleeve for creating a sleeve expanding effect during mounting and dismounting, and having a radial grip acting between the sleeve and the two shaft ends. When the pressure medium has been drained via the through-channels, the radial grip effects a radial as well as an axial joining of the shaft ends and the outer sleeve. A shaft coupling of the type described above is used, for example, for the propeller shaft of a ship which can be subjected to large and varying loads circumferentially as well as axially.

Known couplings of this type provide a generally satisfactory interconnection of the two shaft ends for most operational conditions. However, at very high axial forces, there is a possible risk that the shaft ends may be pulled out from the coupling sleeve. This could be very hazardous for some applications and could lead to severe damage to equipment as well as injuries to personnel.

In light of the foregoing, a need exists for a shaft coupling that is not susceptible to the shaft being pulled out from the sleeve, even in the presence of large axial forces.

SUMMARY OF THE INVENTION

One aspect of the present invention pertains to a shaft arrangement that includes two shaft ends positioned in end-to-end abutting relation and an outer sleeve surrounding the abutting ends of the two shaft ends. The outer sleeve has through-channels for introducing pressure medium in the interface between the shaft ends and the outer sleeve to create a sleeve expanding effect during mounting and dismounting, and a radial grip acting between the sleeve and the two shaft ends, when the pressure medium has been drained through the through-channels, with the radial grip effecting a radial as well as an axial joining of the shaft ends and the outer sleeve. Each shaft end adjacent its abutting end face is equipped with a grip arrangement that is engaged by a thrust member. The thrust member bridges the abutting end faces and engages the grip arrangement inside the outer sleeve to inhibit the two shaft ends from being axially pulled apart even upon application of a large axial force.

According to another aspect of the invention, a shaft arrangement includes two shaft ends having end faces positioned in facing relation to each other and an outer sleeve surrounding the end faces. Each shaft end is provided with an engaging portion located adjacent its respective end face, and a thrust member is positioned inside the outer sleeve and engages the engaging portion on each shaft end while also bridging the end faces of the two shaft ends to inhibit the two shaft ends from being pulled apart axially upon application of an axial force.

In accordance with another aspect of the invention, a shaft arrangement includes two shaft ends having end faces positioned in facing relation to each other with an outer sleeve surrounding the end faces. A thrust member is positioned inside the outer sleeve and bridges the end faces of the two shaft ends. The thrust member includes generally radially inwardly directed portions that engage each of the shaft ends at a position spaced from the respective end faces to inhibit the two shaft ends from being pulled apart axially upon application of an axial force.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein:

FIG. 1 is a cross-sectional view of end portions of two shafts connected together by the shaft coupling in accordance with the present invention;

FIG. 2 is a cross-sectional view of the shaft coupling shown in FIG. 1;

FIG. 3 is a left end view of the coupling arrangement shown in FIG. 1; and

FIG. 4 is a right end view of the coupling arrangement shown in FIG. 1.

DETAILED DESCRIPTION OF THE INVENTION

With reference initially to FIG. 1, a shaft coupling arrangement includes a first shaft end 1 and a second shaft end 2 that are arranged in end-to-end abutting relation to each other, with the end faces of the two shaft ends 1, 2 facing one another. An outer sleeve 3 surrounds and encloses the two shaft ends 1, 2 so that the facing end faces and the abutting joint between the shaft ends is situated within and surrounded by the outer sleeve 3. One axial end of the outer sleeve 3 is provided with a concentric inner portion 4 having a larger inner diameter than the remainder of the outer sleeve 3.

Situated between the outer sleeve 3 and the two abutting shaft ends 1, 2 is an inner or intermediate sleeve 5. This inner sleeve 5 bridges the abutting joint between the two shaft ends and projects axially to such an extent that the inner sleeve 5 axially overlaps the larger inner diameter end portion 4 of the outer sleeve 3. The bore of the outer sleeve 3 is slightly tapering, and the inner sleeve 5 has a correspondingly tapering outer peripheral surface. The end portion of the inner sleeve 5 that axially projects into the larger inner diameter end portion 4 of the outer sleeve 3 is provided with an externally threaded portion. This externally threaded portion cooperates or threadably receives a lock nut 6 that is fitted in the larger inner diameter end portion 4 of the outer sleeve 3. Upon tightening, the lock nut 6 applies an axial force on the inner sleeve 5, thereby causing the inner sleeve 5 to move and increase the grip between the inner peripheral surface of the outer sleeve 3 and itself, while also increasing the grip between the inner sleeve 5 and the abutting shaft ends 1, 2.

The outer sleeve 3 is provided with a plurality of substantially radially directed through-channels 7 which, during the operational life of the shaft coupling, are provided with respective plugs 7a. These channels are used during assembly of the shaft coupling for introducing pressure oil to the area between the outer sleeve 3 and the inner sleeve 5. By providing such oil pressure at the interface, it is possible to increase the tightening of the nut 6 to a value which will provide a tight clamping of the sleeves 3, 5 about the shaft ends 1, 2, when the oil pressure is relieved.

A seal 8 is provided against the side face of the nut 6 that faces the larger inner diameter end portion 4 of the outer sleeve 3 for preventing oil leakage during the assembly of the shaft coupling. A locking arrangement 9 is provided for arresting the lock nut 6 in its tightened position. In the embodiment shown, this locking arrangement 9 comprises cross bars attached by means of screws to the side face of the outer sleeve 3, outside the larger inner diameter end portion 4.

The shaft coupling arrangement shown in FIG. 1 is designed to prevent the two shaft ends 1, 2 from being pulled out of the clamping grip provided by the sleeves 3, 5 if extraordinary forces acting to pull apart the shaft ends 1, 2 should be experienced during operation of the coupling. The portions of the two shaft ends 1, 2 abutting each other in the mounted position are each provided with a relatively short axially extending portion 10 of smaller outer diameter than the major part 1', 2' of the respective shaft ends. The portions of the two shaft ends 1, 2 located adjacent the smaller diameter axially short portions 10 and located on the side of the smaller diameter axially short portions 10 situated away from the abutting joint are each provided with a circumferential groove 11. Each of the circumferential grooves 11 possesses a diameter smaller than that of the adjacent smaller diameter portion 10. Thus, each shaft end 1, 2 is shaped to possess a grooved portion adjacent its end face that is bounded at the axially inner side by a flanged outer portion constituted by the axially short portion 10. With this configuration of the two shaft ends, the abutting joint will have an outer diameter smaller than the inner diameter of the inner sleeve 5, as well as two still smaller diameter portions spaced apart from the respective shaft end faces by the axially short portion 10. A free space thus exists between the abutting joint and the inner sleeve 5.

A thrust member 12 is located in the free space that is formed between the abutting joint and the inner sleeve 5. This thrust member 12 is split diametrically into two semi-circular or substantially semi-circular halves and possesses a cross section that is the reverse image of the free space. Thus, as shown in FIG. 2, each semi-circular thrust member portion has a center portion with an inner contour 13 having dimensions corresponding to the size and shape/form of the axially short portions 10 at both abutting shaft ends. Each thrust member portion also includes radially inwardly depending flanges or gable flanges 14 corresponding to the depth and axial extent of the groove 11 in each shaft end. The flanges 14 are situated on opposite sides of the center portion as shown in FIG. 2.

When assembling the shaft coupling described above, the outer sleeve 3, with the inner sleeve 5 about halfway inserted therein is positioned over one of the shaft ends, for example the shaft end 1. The second shaft end 2 is then positioned in end to end abutting relation to the first shaft end 1. The two semi-circular or substantially semi-circular halves of the thrust member 12 are positioned in the grooves 11 in the shaft ends so that the thrust member 12 bridges the abutting end faces of the shaft ends 1, 2. The outer sleeve 3, still with the inner sleeve 5 only partly introduced therein, is moved axially to the position shown in FIG. 1 so that the abutting joint between the shaft ends 1, 2 will be encompassed by the outer and inner sleeves 3, 5. Thereupon, the inner sleeve 5 is axially displaced inside the outer sleeve 3 by tightening the nut 6, thereby increasing the grip between the tapering sleeves 3, 5 until a desired grip is achieved, which can be monitored by appropriate methods and mechanisms that are known. Finally the lock nut is secured in position by way of the locking bars 9 which are fitted by screws outside the nut 6. The through-channels 7, through which pressure oil has been introduced during the mounting operation are closed by plugs. The shaft coupling arrangement is thus ready for operational service.

By virtue of the thrust member 12 bridging the abutting joint and axially interconnecting the shaft ends 1, 2 by being located in the grip-forming grooves 11 in the shaft ends 1, 2, the present invention makes it possible to ensure that the shaft ends 1, 2 cannot be readily pulled apart inside the sleeve arrangement following, for example, sudden very heavy axial forces acting on the joint. The grooves 11 thus define an engaging portion in each shaft end adjacent the abutting end faces.

The material used to fabricate the different coupling parts is preferably forged steel of high tensile strength.

Although the bridging thrust member 12 has been shown and described as being comprised of two substantially semi-circular ring members having a substantially U-shaped cross-section, it is of course possible to use a thrust member comprised of more than two sections. Also, the cross-sectional profile of the thrust member can be varied from that shown and described.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A shaft arrangement comprising two shaft ends positioned in end-to-end relation with end faces in abutting relation, an outer sleeve surrounding the abutting end faces and having a through-channel for introducing pressure medium in an interface between the shaft ends and the outer sleeve to create a sleeve expanding effect during mounting and dismounting and a radial grip acting between the outer sleeve and the two shaft ends when the pressure medium has been drained through the through-channel, said radial grip effecting a radial as well as an axial joining of the shaft ends and the outer sleeve, each shaft end adjacent its abutting end face including grip means for being gripped, and a thrust member engaging the grip means, said thrust member being positioned inside the outer sleeve and bridging the abutting end faces to inhibit the two shaft ends from being pulled apart axially upon application of an axial force.

2. The shaft arrangement according to claim 1, wherein the grip means in each respective shaft end is a circumferential groove axially spaced apart from the end face of the respective shaft end.

3. The shaft arrangement according to claim 2, wherein the thrust member comprises at least two ring segments each having a substantially U-shaped cross-sectional form defined by a web part positioned between two radially inwardly directed shanks, said shanks each engaging the circumferential groove in one of the shaft ends.

4. The shaft arrangement according to claim 3, including an inner sleeve member positioned between the outer sleeve and the shaft ends, said inner sleeve and said outer sleeve having cooperating tapering surfaces for increasing the radial grip between the shaft ends and the inner and outer sleeves after axial displacement of the inner sleeve relative to the outer sleeve.

5. The shaft arrangement according to claim 2, including an inner sleeve member positioned between the outer sleeve and the shaft ends, said inner sleeve and said outer sleeve having cooperating tapering surfaces for increasing the radial grip between the shaft ends and the inner and outer sleeves after axial displacement of the inner sleeve relative to the outer sleeve.

6. The shaft arrangement according to claim 1, wherein the thrust member comprises at least two ring segments each having a substantially U-shaped cross-sectional form defined by a web part positioned between two radially inwardly directed shanks that grip the grip means.

7. The shaft arrangement according to claim 1, including an inner sleeve member positioned between the outer sleeve and the shaft ends, and a nut threadably engaging one end of the inner sleeve.

8. A shaft arrangement comprising two shaft ends having end faces positioned in facing relation to each other, an outer sleeve surrounding the end faces, each shaft end being provided with an engaging portion located adjacent its respective end face, and a thrust member positioned inside the outer sleeve and engaging the engaging portion on each shaft end while also bridging the end faces of the two shaft ends to inhibit the two shaft ends from being pulled apart axially upon application of an axial force, the engaging portion in each shaft end being a groove that is axially spaced apart from the end face of the respective shaft end.

9. The shaft arrangement according to claim 8, wherein the groove in each shaft end extends completely circumferentially around the respective shaft end.

10. The shaft arrangement according to claim 8, wherein the thrust member comprises at least two ring segments each having a substantially U-shaped cross-sectional form defined by a web part positioned between two radially inwardly directed shanks, said shanks each engaging the circumferential groove in one of the shaft ends.

11. The shaft arrangement according to claim 8, including an inner sleeve member positioned between the outer sleeve and the shaft ends, said inner sleeve and said outer sleeve having cooperating tapering surfaces for increasing the radial grip between the shaft ends and the inner and outer sleeves after axial displacement of the inner sleeve relative to the outer sleeve.

12. The shaft arrangement according to claim 8, including an inner sleeve member positioned between the outer sleeve and the shaft ends, and a nut threadably engaging one end of the inner sleeve.

13. The shaft arrangement according to claim 8, wherein said outer sleeve has a through-channel for introducing pressure medium in an interface between the shaft ends and the outer sleeve to create a sleeve expanding effect during mounting and dismounting and a radial grip acting between the outer sleeve and the two shaft ends when the pressure medium has been drained through the through-channel.

14. The shaft arrangement according to claim 8, wherein one end of said outer sleeve possesses an inner diameter that is greater than an adjoining portion of the outer sleeve.

15. A shaft arrangement comprising two shaft ends having end faces positioned in facing relation to each other with an outer sleeve surrounding the end faces, and a thrust member positioned inside the outer sleeve and bridging the end faces of the two shaft ends, said thrust member including generally radially inwardly directed portions that engage each of said shaft ends at a position spaced from the respective end face to inhibit the two shaft ends from being pulled apart axially upon application of an axial force, the generally radially inwardly directed portions of the thrust member each engaging a groove formed in the respective shaft end.

16. The shaft arrangement according to claim 15, wherein the groove formed in each shaft end extends completely circumferentially around the shaft end.

17. The shaft arrangement according to claim 15, including an inner sleeve member positioned between the outer sleeve and the shaft ends, said inner sleeve and said outer sleeve having cooperating tapering surfaces for increasing the radial grip between the shaft ends and the inner and outer sleeves after axial displacement of the inner sleeve relative to the outer sleeve.

18. The shaft arrangement according to claim 15, wherein said outer sleeve has a through-channel for introducing pressure medium in an interface between the shaft ends and the outer sleeve to create a sleeve expanding effect during mounting and dismounting and a radial grip acting between the outer sleeve and the two shaft ends when the pressure medium has been drained through the through-channel.

* * * * *